United States Patent [19]

Heckeroth

[11] 4,120,625
[45] Oct. 17, 1978

[54] DIE FACE CUTTER

[75] Inventor: Earl T. Heckeroth, Midland, Mich.

[73] Assignee: The Dow Chemical Company, Midland, Mich.

[21] Appl. No.: 788,384

[22] Filed: Apr. 18, 1977

[51] Int. Cl.² .............................................. B29F 3/08
[52] U.S. Cl. ...................................... 425/71; 425/313;
425/379 R; 425/382 R; 425/464; 425/DIG. 230
[58] Field of Search ............ 425/378 R, 378 S, 379 R,
425/379 S, 292, 309, 311, 313, 382 R, 72 R,
382.2, 463, 464, 72 S, 192 R, DIG. 230, 71;
264/141, 142, 143, 148, 176 R, 348

[56] References Cited

U.S. PATENT DOCUMENTS

| 1,353,917 | 9/1920 | Lambert | 425/378 |
| 2,401,236 | 5/1946 | Fielitz | 425/382 R X |
| 3,039,142 | 6/1962 | Zauasnik | 425/71 X |
| 3,553,776 | 1/1971 | Romagano et al. | 425/382 R X |

FOREIGN PATENT DOCUMENTS 2,140,194  2/1973  Fed. Rep. of Germany ...... 425/379 R Primary Examiner—Francis S. Husar
Assistant Examiner—Mark Rosenbaum

[57] ABSTRACT

An improved die face cutter is provided which has a fluid cooled plate disposed on the die face. Smearing of freshly cut polymer is reduced.

6 Claims, 4 Drawing Figures

DIE FACE CUTTER

Many plastic materials are provided to the processor in the form of granules. In many instances, such granules are formed by the extrusion of a plurality of strands which are subsequently cut into a plurality of granules. Often the length of the granules is from about one-half to three times the strand diameter. Strands of plastics can be cut with varying degrees of difficulty or ease depending upon the basic nature of the extruded material, temperature and the like. One particularly desirable form of die face cutter is disclosed in U.S. Patent Application Ser. No. 619,350 filed Oct. 3, 1975, now U.S. Pat. No. 4,021,176. Water-cooled knives and water spray cooling are employed to chill the extruded strand and enhance the cutting characteristics of the extruded thermoplastics. Another die face cutting arrangement effectively extrudes a strand through a porous bushing and a cooling fluid is forced inwardly through the porous bushing to cool the external surfaces of the strand prior to contact with a cutting knife. Such apparatus for many applications can be unduly complex, require substantial mechanical adjustment and oftentimes repair or replacement of plugged bushings, knives and the like.

It would be desirable if there were available an improved plastic strand cutter of relatively simple construction.

It would also be desirable if there were available an improved die face cutter which reduced adhesion of polymer to the cutting face.

It would also be desirable if such a cutter could be maintained with minimum effort.

These benefits and other advantages in accordance with the present invention are achieved in an apparatus for the preparation of granules from a plurality of extruded heat-plastified synthetic resinous thermoplastic strands, the apparatus comprising in cooperative combination a die, the die having a die body, the die body defining a plenum, the plenum having a means to communicate with a source of heat-plastified synthetic resinous material, the die having a die face of generally annular configuration, the die body adjacent the die face defining a plurality of extrusion openings communicating with the annular plenum, the extrusion openings being capable of extruding heat-plastified synthetic resinous strands, the extrusion openings terminating on the die face remote from the means to communicate with the source of heatplastified thermoplastic resinous material, a cooling plate disposed adjacent the die face and being generally spaced from the die face, the cooling plate exposing the extrusion openings and permitting passage of the resinous strands, a rotatable cutter adapted to work against the cooling plate and to engage extruded thermoplastic strands emerging from the extrusion openings, to thereby sever the strands into pellets or granules.

Further features and advantages in accordance with the present invention will become more apparent in connection with the Drawing wherein:

FIG. 1 schematically depicts a view of a cutting apparatus in accordance with the present invention;

Figure 1:
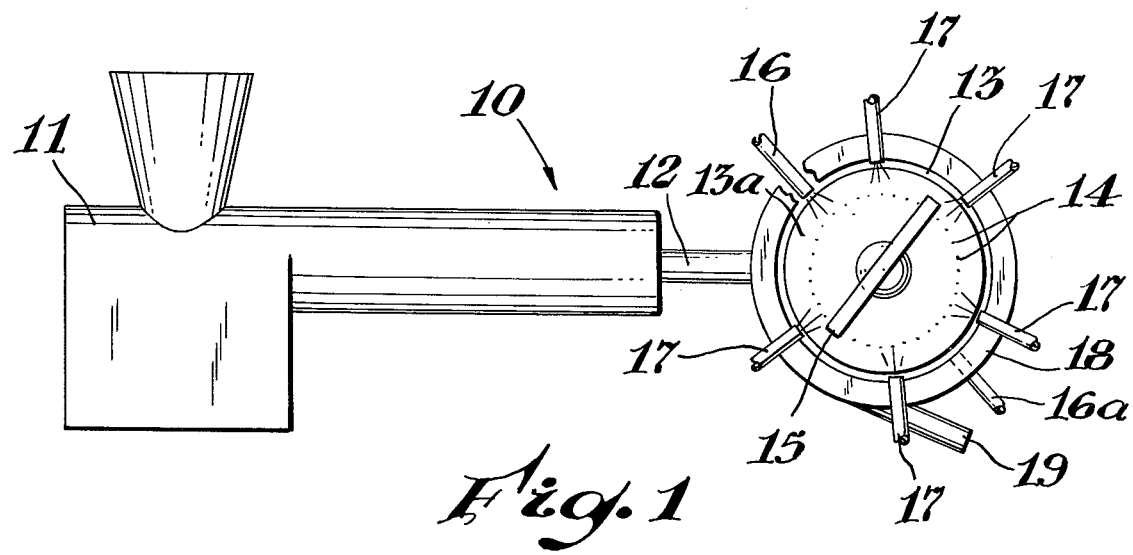

In FIG. 1 there is schematically depicted an extrusion and pelleting apparatus in accordance with the present invention generally designated by the reference numeral 10. The apparatus 10 comprises in cooperative combination a source 11 of heat-plastified synthetic resinous material such as an extruder. The source 11 has a discharge conduit 12 which in turn is in communication with a die 13 of generally circular configuration having an annular plenum disposed therein. The die 13 has a plurality of extrusion openings 14 arranged in a circular manner generally coaxial with the die. The extrusion openings 14 are generally coplanar. A rotatable cutting blade 15 is mounted generally concentrically with the circle formed by the openings 14. A cooling plate 13a forms the visible face of the die 13. A cooling fluid supply means 16 is in operative combination with a generally annular chamber, (not shown), within the plate 13a. A discharge conduit 16a is also in communication with the annular chamber. Six external cooling means or nozzles 17 are generally radially directed inwardly toward the face of plate 13a. A shroud or cowl 18 is disposed about the die 13 and adapted to collect granule generated therein. The shroud 18 has a dicharge conduit 19.

In operation of the apparatus as depicted in FIG. 1, heat-plastified synthetic resinous material is supplied by the extruder 11 to the discharge conduit 12 to the body of the die 13 where it is distributed to the extrusion openings 14 and extruded therefrom as continuous strands. Optionally, a cooling fluid, for example, water, flows from supply 16 through the plate 13a and is discharged from conduit 16a. Rotation of the cuter or blade 15 severs the strands into granules. A cooling liquid such as a water spray is provided by the nozzles 17 which provides cooling to both the plate 13a, the extruded strands and the product granules. The granules together with any cooling liquid are restrained by the shroud 18 and discharged from the discharge opening 19.

Figure 2:
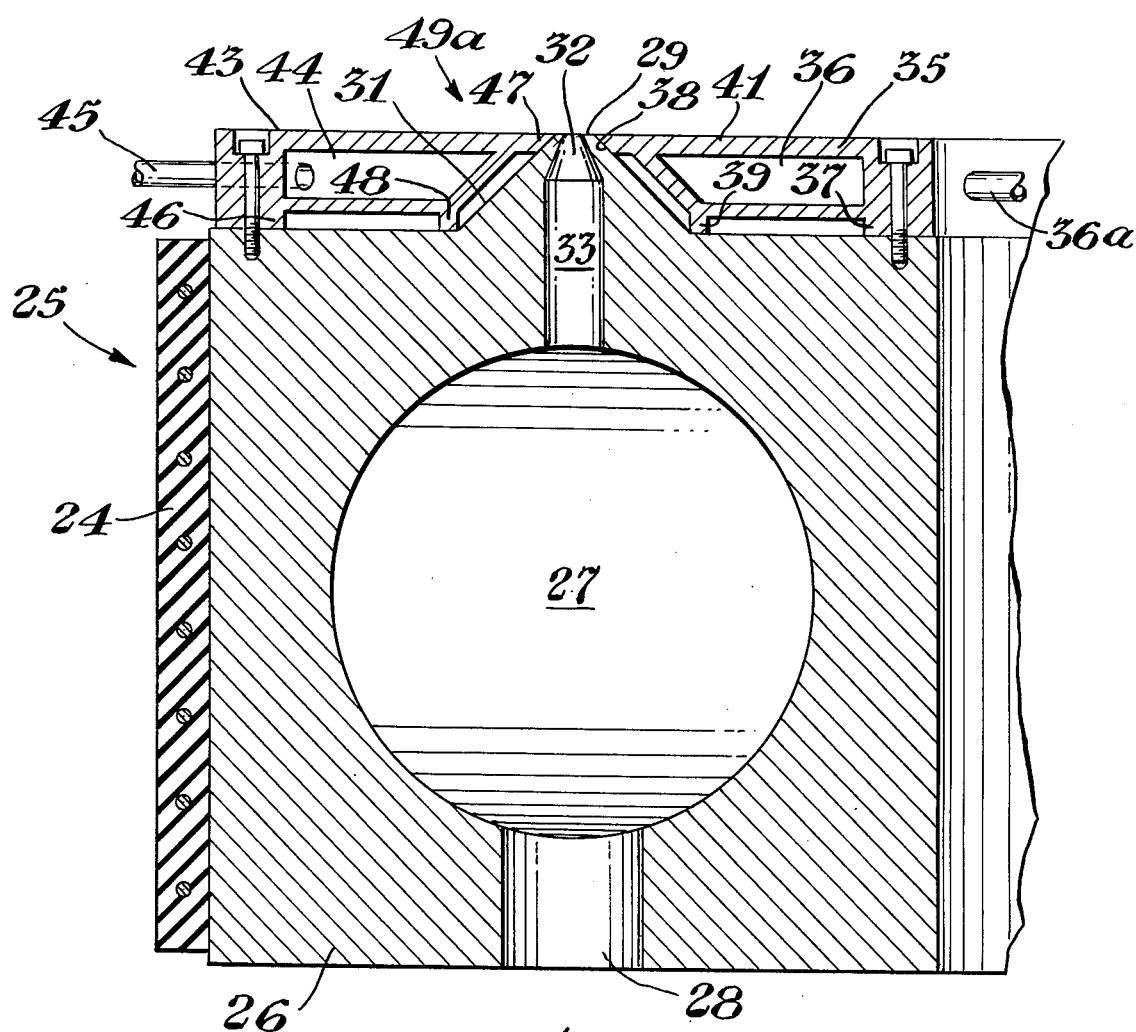
FIG. 2 is a radial sectional view through an annular die such as the die employed in FIG. 1.

In FIG. 2 there is schematically depicted a radial sectional view of a die similar to the die 13 of FIG. 1. The die 25 comprises a generally annular die body 26. The die body 26 defines therein a generally annular cavity 27. The cavity 27 is in operative communication with a heat-plastified polymer supply passageway 28. The die body 26 defines an extrusion face 29 having an annular land 31 disposed thereon. The land 31 defines a plurality of extrusion openings 32, (one shown). Associated with each of the extrusion openings or orifices 32 is a polymer supply passageway 33 which is in full communication with the annular plenum 27. An electrical band heater 24 is disposed about the die body 26. The first or inner cooling plate or jacket 35 is disposed on the portion of the face 29 enclosed by the land 31. The plate 35 defines an internal space 36 which is provided with a cooling fluid such as water through a conduit 36a. The cooling fluid is exhausted from the space 36 by a second conduit, not shown. The plate 35 is spaced from the die face 29 by means of an inner land 37, an outer land 38 and an intermediate land 39. The lands 37, 38 and 39 bear against the die face 29 and thereby space the plate from the die body 26. Remote from the die face 29, the plate 35 defines a generally planar surface 41 which is generally coplanar with the terminal portion of the extrusion orifices 32. A second or outer plate or jacket 43 is disposed on the die face 29 external to the land 31. The plate 43 defines an internal cooling fluid passageway 44 in operative communication with the cooling fluid supply means 45 and a cooling fluid discharge conduit is remotely disposed from the conduit 45 and is not shown. The jacket 43 is supported and spaced from the die face 29 by means of an outer land 46, an inner land 47, and an intermediate land 48. When it is desired to operate without cooling fluid, flowing through passageway's 36 and 44 thermal insulation, such as asbestos, may be disposed between land pairs 37-39, 38-39, 46-48. The plate 43 has an external generally planar face 49 remotely disposed from the die face 29. The face 49 is generally coplanar with the face 41 of the inner jacket and the adjacent terminal portions of the extrusion orifices 32. The annular plates 35 and 43 provide a face 49a against which a cutter such as the cutter 15 works. By means of the use of cooling fluid from nozzles such as nozzles 17 of FIG. 1 and optionally water circulating within the jackets 35 and 43, no sticking of the extruded polymers occurs to the face of 49a. If the apparatus is employed for polymer compositions which are extruded at higher temperatures, often the cooling plate may be solid, i.e., without the cavities 36 and 44.

Figure 3:
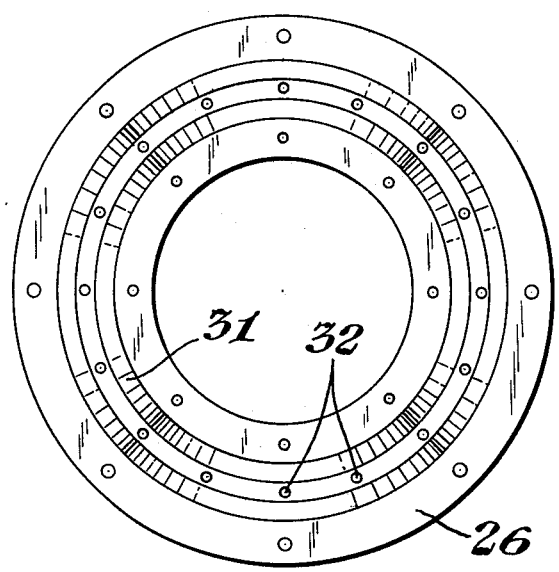
FIG. 3 is a face view of a die body such as is depicted in FIG. 2.

FIG. 3 is a face view of the die body 26 of FIG. 2 showing the location of the land 31 and extrusion orifices 32.

Figure 4:
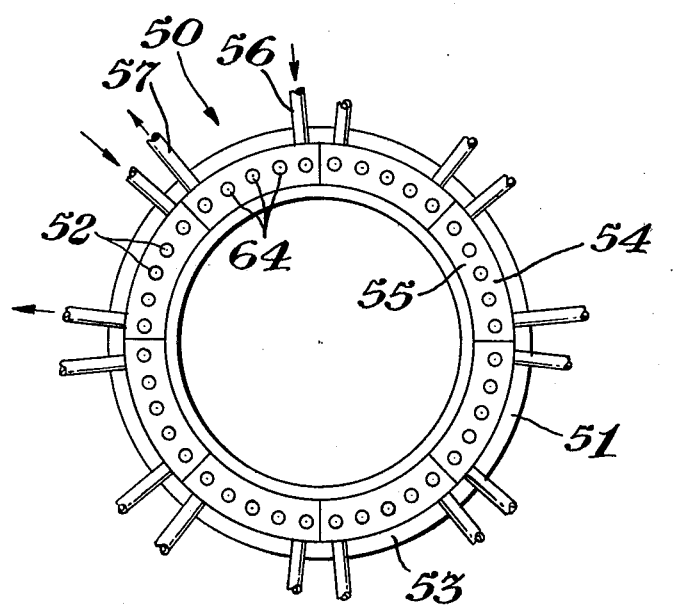
FIG. 4 is a face view of an alternate die in accordance with the present invention.

In FIG. 4 there is a schematic representation of an alternate die suitable for the practice of the present invention designated by the reference numeral 50. The die 50 comprises a die body 51 having a plurality of extrusion orifices 52 disposed on a die face 53. A segmented plate 54 is disposed on the face 53. The plate 54 comprises a plurality of segments 55 of generally accurate configuration having a plurality of openings corresponding to the die openings 52. Each segment 55 has a cooling fluid inlet 56 and a cooling fluid outlet 57. The segmented plate becomes particularly desirable as the diameter of the die increases. Each of the segments 55 are individually fixed to the die face 53 and as the die body expands, the segments move with it maintaining alignment of the extrusion openings and jacket openings.

Due to the direct fluid cooling of the face (such as face 49a) against which the knife works, smearing and sticking of the polymer to the blade or face is eliminated or at least reduced to a tolerable level. Apparatus in accordance with the present invention can be employed to pelletize any extrudable heat-plastifiable synthetic resinous material capable of being pelletized with a die face cutter.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention excepting as it is set forth and defined in the hereto appended claims.

I claim:

1. An apparatus for the preparation of granules from a plurality of extruded heat-plastified synthetic resinous thermoplastic strands, the apparatus comprising in cooperative combination a die, the die having a die body, the die body defining an annular plenum, the plenum having a means to communicate with a source of heat-plastified synthetic resinous material, the die having a die face of generally annular configuration, the die body adjacent the die face defining a plurality of extrusion openings communicating with the annular plenum, the extrusion openings being capable of extruding heat-plastified synthetic resinous strands, the extrusion openings terminating on the die face remote from the means to communicate with such a source of heat-plastified thermoplastic resinous material, a cooling plate placed along the die face and being spaced in some areas from the die face, the cooling plate exposing the extrusion openings and permitting passage of the resinous strands, a rotatable cutter operatively associated with said plate to work against the cooling plate and to engage extruded thermoplastic strands emerging from the extrusion openings, to thereby sever the strands into pellets or granules, said die face where the extrusion openings terminate and a downstream surface of the cooling plate being coplanar 2. The apparatus of claim 1 including at least one nozzle capable of providing a spray of cooling fluid on the cooling plate and adjacent cutter.

3. The apparatus of claim 1 wherein the cooling plate has at least one passageway defined therein for the circulation of cooling fluid.

4. The apparatus of claim 2 wherein the cooling plate has at least one passageway defined therein for the circulation of cooling fluid.

5. The apparatus of claim 1 wherein the cooling plate is spaced from the adjacent die by means of lands.

6. The apparatus of claim 1 wherein the cooling plate comprises a plurality of segments capable of independent movement as the die expands with increasing temperature.

* * * * *

UNITED STATES PATENT AND TRADEMARK OFFICE
CERTIFICATE OF CORRECTION

PATENT NO.   : 4,120,625
DATED        : Oct. 17, 1978
INVENTOR(S)  : Earl T. Heckeroth It is certified that error appears in the above-identified patent and that said Letters Patent are hereby corrected as shown below:

Column 2, line 23, delete "granule" and insert --granules--.

Column 2, line 24 delete "dicharge" and insert --discharge--.

Column 2, line 32 delete "cuter" and insert --cutter--.

Column 3, line 9 should read:

37-39,38-39,46-48 and 47-48.  The plate 43 has an external gener

Signed and Sealed this

Twenty-seventh Day of November 1979

[SEAL]

Attest:

RUTH C. MASON
*Attesting Officer*

LUTRELLE F. PARKER
*Acting Commissioner of Patents and Trademarks*